United States Patent Office 3,394,966
Patented July 30, 1968

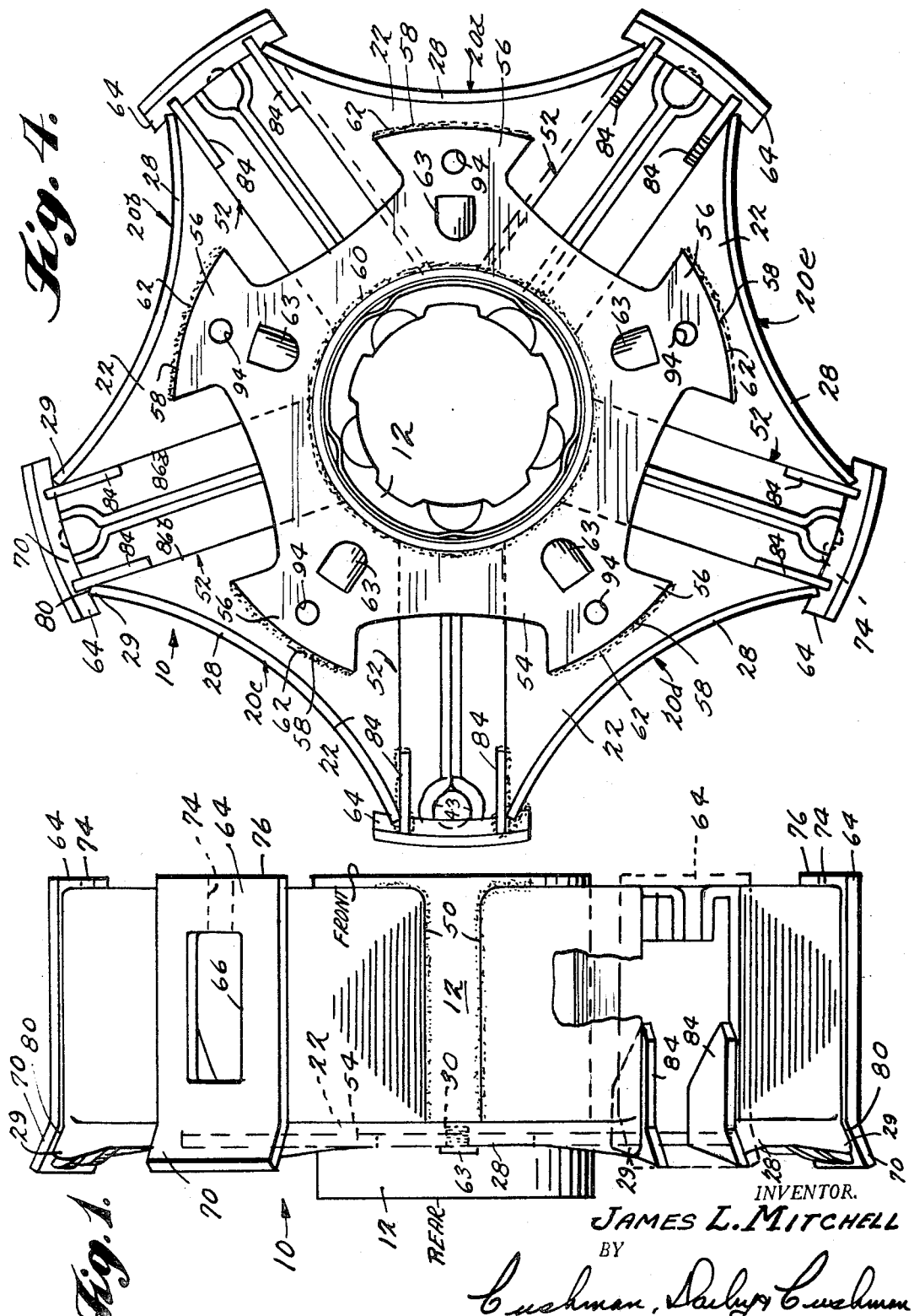

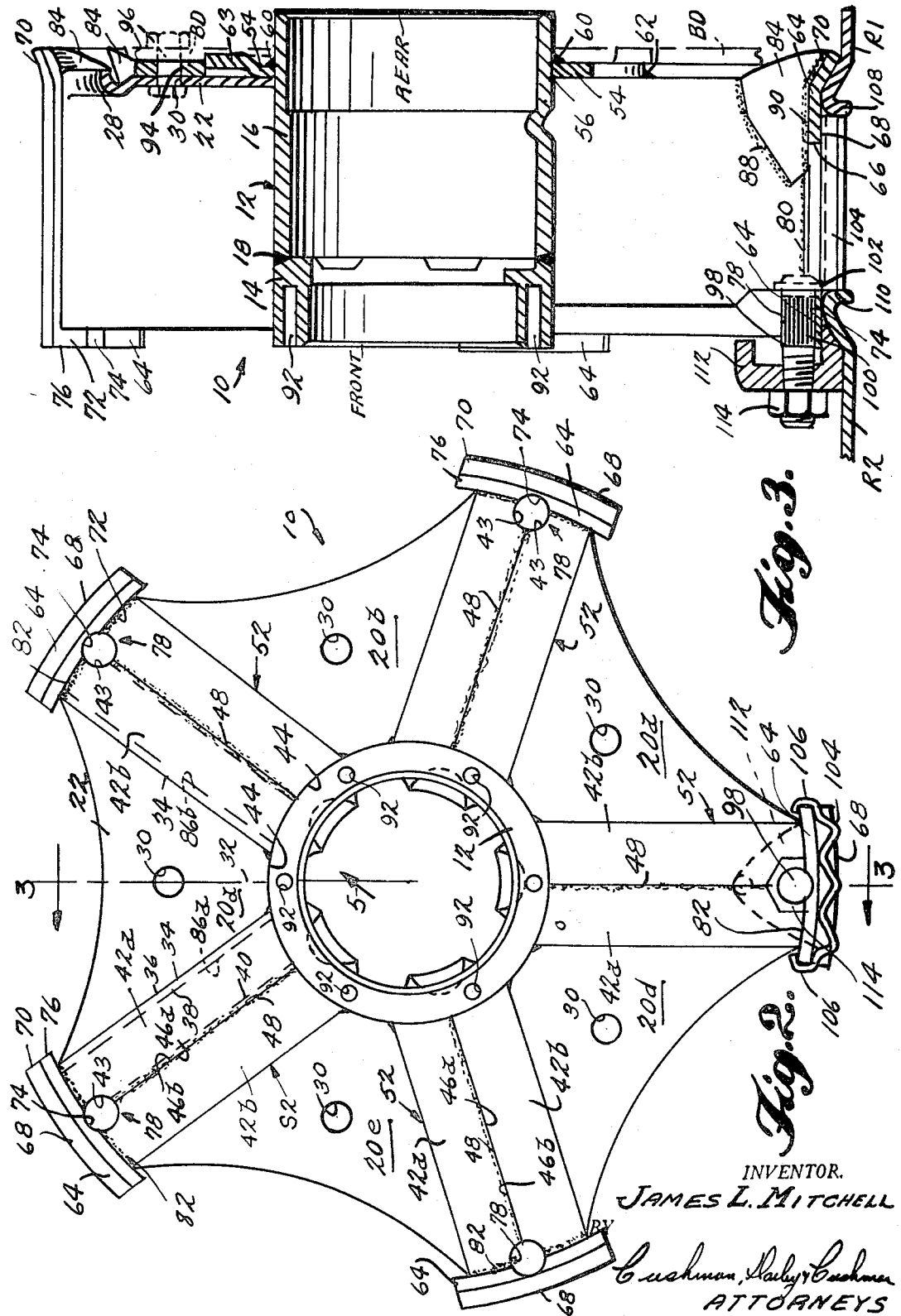

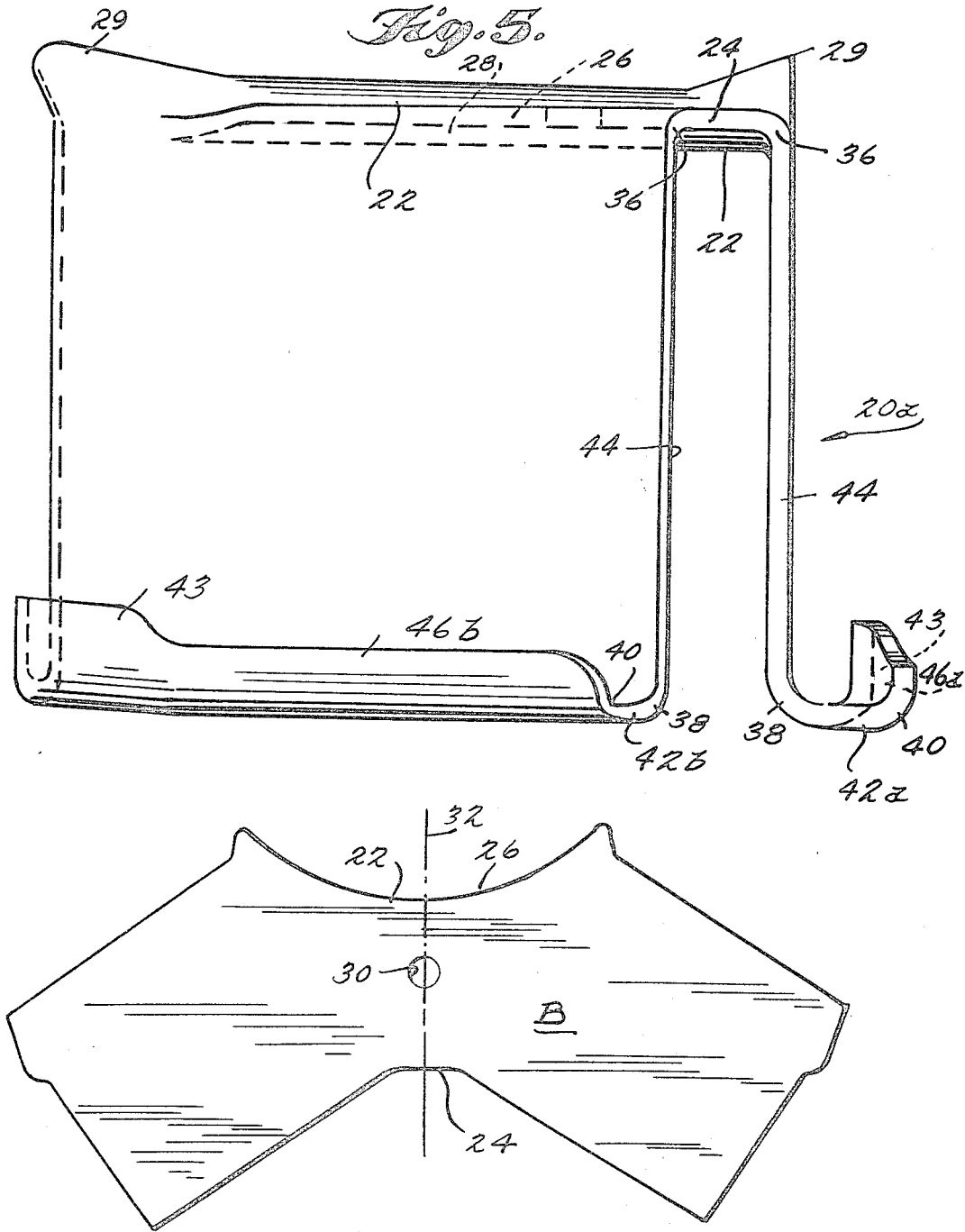

3,394,966
VEHICLE WHEEL
James L. Mitchell, Springfield, Mo., assignor to Hutchens & Son Metal Products, Inc., Springfield, Mo., a corporation of Missouri
Filed Oct. 6, 1966, Ser. No. 584,852
12 Claims. (Cl. 301—12)

ABSTRACT OF THE DISCLOSURE

The wheel comprises a tubular hub and a plurality of pressed sheet steel spoke sections each including a central web and longitudinal opposite halves of spokes at the opposite angular margins thereof, each spoke half being welded to angularly adjacent complementary spoke halves on adjacent spoke sections and all of the sections being secured to the tubular hub peripherally of the hub.

---

The present invention relates to a vehicle wheel and more particularly to a fabricated spoke wheel for demountably mounting a plurality of rim-carried road engaging elements.

The wheel of the present invention is particularly designed for use on heavy truck-trailer units operating on or off highways, for instance to mount conventional dual 20 inch tires carried on conventional demountable rims, however, the wheel of the invention can be modified to accommodate other sizes of rims and tires and for use on other vehicles without departing from the principles of the invention.

Essentially, it is an object of the present invention to provide a wheel of the type described which comprises a tubular hub and a plurality of pressed sheet steel spoke sections each including a central web and longitudinal opposite halves of spokes at the opposite angular margins thereof, each spoke half being welded to angularly adjacent complementary spoke halves on adjacent spoke sections and all of the sections being secured to the tubular hub peripherally of the hub.

Further according to the present invention a spoke strengthening, generally star-shaped brake drum pilot concentrically mounted and secured to one face of the spokes.

Another object of the invention is the provision of precision formed shoes welded onto the spoke outer ends and constructed and arranged to provide the proper diameter and cone shape to receive conventional demountable rims.

A further object of the invention is the provision of complementary halves of a bolt receiving opening between each spoke half near the radially outer end thereof and the respective spoke shoe constructed and arranged to receive a serrated shank body bearing bolt driven or pressed into place so as to provide greater elastic stretch than is available from conventionally employed threaded studs and carriage bolts.

A further object of the invention is the provision of novel arcuately discontiuous rim spacer means which are lighter in weight for shipping and less susceptible to shipping and installation damage than conventional hoop-type rim spacers.

These and further objects of the present invention, as well as the principles and scope of applicability thereof, will become more fully apparent during the course of the following detailed discussion that is keyed to the preferred embodiment shown in the attached drawings.

In the drawings:

FIGURE 1 is a top plan view of a fabricated spoke wheel according to the present invention;

FIGURE 2 is a front elevation view of the wheel of FIGURE 1;

FIGURE 3 is a diametrical sectional view taken along the line 3—3 of FIGURE 2, one rim spacer and bolt, nut rim clamp assembly according to the invention are shown on the lowest spoke in FIGURES 2 and 3; a brake drum and demountable rims for two tires are shown in FIGURE 3;

FIGURE 4 is a rear elevation view of the wheel of FIGURES 1–3;

FIGURE 5 is a plan view of one spoke element observed from the direction of the arrow 5 of FIGURE 2;

FIGURE 6 is a reduced scale top plan view of a blank for forming the spoke element of FIGURE 5.

The wheel 10 includes a tubular hub 12, which may be made of a plurality of tubular sections, for instance 14, 16, in abutting axial alignment and circumferentially welded together, for instance at 18, typically to provide surfaces and seats for accommodating various bearing types, sizes and configurations within. It should be observed that hubs of varied length and interior configuration can be substituted for the embodiment depicted without necessitating restructuring of the remainder of the wheel 10. This represents a distinct advantage over cast wheels wherein mold cost and coring and machinery costs impose real limitations on variations.

The wheel 10 further comprises a plurality of identical spoke sections 20 (20a, 20b, 20c, 20d, 20e) pressed formed from sheet metal, preferably sheet steel, for instance each from a blank B as depicted in FIGURE 6, a finished spoke section being shown by itself in FIGURE 5. In general, each spoke section 20 comprises a central generally trapezoidal web 22 shown toward the rear of the section 20a as seen in FIGURE 1 and at the top as shown in FIGURE 5. The radially innermost and radially outermost generatrices 24, 26 of the web 22 are convex toward one another and a stiffening flange 28 is formed on the web 22 at the generatrix 26 so as to point axially rearwardly as best seen in FIGURES 3 and 4. As is evident in FIGURES 2 and 5, the flange 28 is axially shortest at its center and includes protruding ears 29 at its arcuately opposite ends. At the geometric center of the web 22 a pilot hole 30 is formed. Each spoke section 20 is symmetrical about the web radius line 32 which passes through the center of the pilot hole 30 therein.

Referring to the orientation spoke section 20a of FIGURE 2, at the two opposite arcuate margins 34 of the web 22 thereof, the spoke sections 20 bend perpendicularly axially upwardly at 36 ("up" being toward the viewer), then perpendicularly arcuately at 38, then perpendicularly axially downwardly at 40 (see also FIGURE 5), to form a radially directed longitudinal half of a spoke 42a, 42b at each arcuate margin of the web 22. In addition, each spoke half near its radially outer extent is depressed arcuately at 43 toward its symmetry line 32 to form part of an opening means to receive a bolt as will be described more fully hereinafter. It should be noted that, from the aspect of FIGURE 2, each spoke section 20 presents a cylindrically concave edge surface 44 radially inwardly. To fabricate the wheel 10 the spoke sections are placed arcuately side by side with the surfaces 46a and 46b of adjacent spoke halves being welded to each other as shown at 48 in FIGURE 2 and the surface 44 of each spoke section 20 being welded to the exterior of the hub 12 as shown at 50 in FIGURE 1 so as to form five spokes 52 in the depicted embodiment.

With special attention to FIGURES 3 and 4, the wheel 10 further includes a generally star-shaped brake drum pilot 54 also formed from sheet metal and having a central circular opening 56 just slightly larger than the diameter of the exterior of the hub 12 at the point where the pilot is to be located, and five arcuately spaced radial arms 56 each having a radially outer-most edge 58 equal to approximately one-eighth the circumference of the pilot and a radius at least slightly greater than that of the pilot hole 30 circle.

Accordingly, after the spoke sections 20 have been welded in place the brake drum pilot is slid onto the hub with the arms 56 arcuately half-way between respective spokes 52 and into abutment with the rear of the spokes 52. As shown in FIGURE 4, the pilot is circumferentially welded to the hub at 60 and the arm edges 58 to the respective webs at 62. Each pilot arm is lanced at 63 and bent to form a positive locator for the brake drum D to ensure the concentricity thereof with respect to the wheel.

As seen in FIGURES 1–4, each spoke 52 is provided at its radially outermost extent with a spoke shoe 64. Each spoke shoe 64 may be formed of sheet steel and is shown being generally rectangular in plan, having a central cutout at 66. The spoke shoes 64 are bent so as to be generally cylindrically curved about an axis parallel with their length direction, the convex face 68 being presented radially outwardly. The shoes 64 also each have an obliquely radially outwardly directed flange 70 along the rear thereof which is curved in the same sense as the remainder of each respective shoe. Parallel to and centered along the long axis of the concave undersurface 72 of each shoe 64 is formed a shallow outwardly concave channel 74 which extends between the forward edge 76 of each respective shoe and the cut-out 66 thereof.

Each shoe underside is presented against the radially outer extent of a spoke 52, the channel therein cooperating with two complementary depressions 43 to define a bolt receiving opening 78 and the ear 29 edges 80 abutting the rear surface of the respective flange 70. The spoke shoes are welded to respective spokes 52 at 82 and serve not only to provide the proper diameter and wedge shape for receiving conventional demountable rims, but also serve to strengthen the joint between respective welded together spoke halves.

The numeral 84 designates ten generally shark dorsal fin-shaped gussets of sheet steel placed facewise against the inside opposite side surfaces 86a, 86b of each spoke 52 and edgewise against the underside of the respective spoke shoes including the oblique flange 70 thereof and welded in place at 88, 90 to reinforce the spoke ends and rim mounting region of the wheel 10.

After the above-described parts have been welded in place, hub and drum bolt holes 92, 94 are machined as required, respectively to mount a hub cap (not shown) and a brake drum BD via bolts 96.

It is currently conventional in the truck trailed demountable rim wheel art to use a threaded stud or carriage head type bolt inserted through the end of each wheel spoke to retain a rim clamp in secure position. With a conventional stud, such as a ¾-inch 10 N.C. x 2¹³⁄₁₆-inch long stud, only about ¾ inch of bolt length is stretched when the stud is in place and is retaining a rim clamp against a tire rim. For conventional bolt material, actual elastic bolt stretch under such circumstances is about 0.0057 inch. Carriage head type bolts also conventionally used are similarly defficient in elastic stretchability due to their shortness and are additionally disadvantageous in that they can fall out once the threaded fastener has been removed.

According to the present invention a serrated shank body bearing bolt 98 is pressed or driven into each opening 78 from the rear thereof each bolt head projecting into each respective spoke shoe cut-out. Each bolt 98 is, for instance, a ¾-10 N.C. x 2⅞-inch lug bolt serrated at 100 and slightly oversize with respect to the respective opening 78. In the embodiment shown (FIGURE 3), a flat is cut on one side of the bolt head at 102 to prevent interference with the rims or rim spacers.

Referring to FIGURE 3, in use, a demountable tire carrying rim R1 is slid over the spoke shoes 64 and brought into engagement with the spoke shoe flanges 70. A novel rim spacer 104 is then axially slid or clipped onto each spoke shoe (shown on the lowermost spoke shoe in FIGURES 2 and 3). Each spacer 104 is corrugated about axes parallel to the longitudinal axis of the wheel 10 and has tabs 106 at each end thereof which project around the respective spoke shoe into contiguity with the margins of the back side thereof. Each spacer 104 is of a width equal to the desired spacing of the rims R1 and R2 to be demountably mounted.

After the spacers 104 are in place, with inner edges 108 abutting the rim R1, the demountable tire carrying rim R2 is slid over the spoke shoes and brought into engagement with the outer edges 110 of the spacers 104. Next, conventional rim clamps 112 are placed on the bolts 98 and slid into engagement with the rim R2. Nuts 114 are then threaded onto the bolts 98 and torqued to tension the bolts and thus resiliently force the rim clamps against the rim R2.

In comparison with conventional rim clamping bolts discussed above, the novel bolts according to the invention embodiment just described are stretched over 2¼ inches of bolt length so that actual elastic bolt stretch is about 0.158 inch. This means that when a clamped wheel assembly including the wheel 10 is subjected to wear, dynamic road shocks or deformations, the rim clamping bolts of the present invention would still have elastic stretchability and thus maintain clamping tension long after conventional bolts would have become completely loose due to their having a shorter stretchable region.

The rim spacers 104 of the present invention, besides providing material, weight and shipping savings advantages over prior art hoop-type spacers also provide advantages in installation and performance.

Conventional hoop-type rim spacers are particularly vulnerable to damage during installation including permanent deformation caused when clamp bolts are overtorqued or hammers are required to get them onto wheels due to dirt, corrosion, interfering tolerances, out-of-roundness of the spacers caused during shipping or the like. When clamp bolts are torqued unevenly, the tighter bolts can easily cause conventional spacers to yield. This allows the outer rim to fit incorrectly so that lateral run-out is caused at the outer tire. In contrast, the corrugated, individual spacers according to the present invention function as straight compression, columnar members of controlled length to space the rims correctly at each spoke clamping area. Thus the more rigid spacers of the present invention are much less subject to excessive deformation and are easier to emplace and replace.

It should now be apparent that the fabricated spoke wheel of the present invention as described herein accomplishes each of the objectives stated at the outset of this specification and that the embodiment described clearly illustrates the principles of the invention. Because the described embodiment can be considerably modified without departing from these principles or failing to provide for accomplishment of these objectives, the present invention should be understood as encompassing all such modifications as are within the spirit and scope of the following claims.

What I claim is:

1. A fabricated spoke wheel for demountably mounting at least one rim carried road engaging element, said wheel comprising: a tubular hub; a plurality of angularly abuttingly adjacent segmental pressed sheet metal spoke sections, each spoke section including a central web and opposite longitudinal halves of radially directed spokes at the opposite angular margins thereof; means securing each spoke half to an angularly adjacent complementary spoke half on an adjacent spoke section of said spoke sections thereby defining a plurality of radially directed spokes; means securing all of said spoke sections to said tubular hub circumferentially of the hub; and means on the radially outer ends of said spokes for demountably mounting at least one rim; each spoke section being symmetrical about the radial center line thereof, and wherein each spoke section, at the opposite arcuate margins of the central web thereof first bending substantially perpendicularly axially forwardly, then secondly substantially perpendicularly arcuately of the hub, then thirdly substantially perpendicularly axially rearwardly to constitute the two spoke longitudinal halves thereon.

2. The fabricated spoke wheel of claim 1 further comprising a spoke strengthening, generally star shaped brake drum pilot having means defining a central opening therethrough; said pilot being received on said hub in coaxial circumferentially surrounding relationship with said hub; means located peripherally of said opening securing said pilot to said hub; said pilot including a plurality of radiating arms; each arm at the radially outer end thereof being secured to a spoke section central web; and axially projecting brake drum locating means formed on said pilot and facing away from said webs.

3. The fabricated spoke wheel of claim 2 wherein said arms equal said webs in number and are in registry with the radial center lines of respective webs; and further having means defining an axially aligned bolt hole through each arm and web constructed and arranged for securement of a brake drum to said wheel.

4. The fabricated spoke wheel of claim 1 wherein the means securing the spoke sections to one another and to the hub comprise welds.

5. The fabricated spoke wheel of claim 1 wherein the means on the radially outer ends of the spokes for demountably mounting at least one rim include: a generally rectangular, cylindrically curved spoke shoe secured to the radially outer end of each spoke oriented so as to be convex radially outwardly of said hub and so as to have the axis of cylindrical curvature thereof parallel to the longitudinal axis of said hub; means formed on one axial end of each spoke shoe for wedgingly retaining a first rim, rim spacer means received on said spoke shoes having opposite axial ends, one end being constructed and arranged to abut said first rim and the other end being constructed and arranged to abuttingly receive a second rim thereagainst; and means secured to said spokes adjacent the outer end thereof and constructed and arranged to resiliently force the second rim toward said rim spacer means.

6. The fabricated spoke wheel of claim 5 wherein the resiliently forcing means comprises: means defining a pair of complementary arcuate depressions in each spoke half immediately adjacent the respective spoke shoe constructed and arranged to define a generally cylindrical opening between each pair of said depressions and the respective spoke shoe; bolts having each a shank diameter at least as large as that of each respective cylindrical opening interferingly received in each respective cylindrical opening and each having a threaded portion projecting axially forwardly from the respective spoke sufficiently to receive a rim clamp and threaded fastener.

7. The fabricated spoke wheel of claim 1 further including an integral axially rearwardly directed flange on each central web along the entire radially outer margin thereof terminating at each arcuate end thereof in means defining an ear welded to said demountably mounting means.

8. The fabricated spoke wheel of claim 7 further including a sheet metal gusset positioned facewise against the interior of each spoke half between the first and second bends therein immediately adjacent the radially outer end thereof in edgewise contact with means defining an undersurface on the respective demountably mounting means and being welded to both the respective spoke half and demountably mounting means.

9. A fabricated spoke wheel for demountably mounting at least one rim carried road engaging element, said wheel comprising: a tubular hub; a plurality of angularly abuttingly adjacent segmental pressed sheet metal spoke sections, each spoke section including a central web and opposite longitudinal halves of radially directed spokes at the opposite angular margins thereof; means securing each spoke half to an angularly adjacent complementary spoke half on an adjacent spoke section of said spoke sections thereby defining a plurality of radially directed spokes; means securing all of said spoke sections to said tubular hub circumferentially of the hub; and means on the radially outer ends of said spokes for demountably mounting at least one rim; the means on the radially outer ends of the spokes for demountably mounting at least one rim including: a generally rectangular, cylindrically curved spoke shoe secured to the radially outer end of each spoke oriented so as to be convex radially outwardly of said hub and so as to have the axis of cylindrical curvature thereof parallel to the longitudinal axis of said hub; means formed on one axial end of each spoke shoe for wedgingly retaining a first rim, rim spacer means received on said spoke shoes having opposite axial ends, one end being constructed and arranged to abut said first rim and the other end being constructed and arranged to abuttingly receive a second rim thereagainst; and means secured to said spokes adjacent the outer end thereof and constructed and arranged to resiliently force the second rim toward said rim spacer means; the resiliently forcing means comprising: means defining a pair of complementary arcuate depressions in each spoke half immediately adjacent the respective spoke shoe constructed and arranged to define a generally cylindrical opening between each pair of said depressions and the respective spoke shoe; bolts having each a shank diameter at least as large as that of each respective cylindrical opening interferingly received in each respective cylindrical opening and each having a threaded portion projecting axially forwardly from the respective spoke sufficiently to receive a rim clamp and threaded fasteners; each spoke shoe having means defining a central cut-out; means defining a concave channel in each spoke shoe facing the outer end of the respective spoke and the respective cylindrical opening and extending between the respective spoke shoe cut-out and the respective spoke shoe opposite axial end from said one end; each bolt having a head at least partly received in the respective spoke shoe cut-out and abutting the respective spoke shoe peripherally of the respective spoke shoe cut-out at one end of the respective concave channel.

10. A fabricated spoke wheel for demountably mounting at least one rim carried road engaging element, said wheel comprising: a tubular hub; a plurality of angularly abuttingly adjacent segmental pressed sheet metal spoke sections, each spoke section including a central web and opposite longitudinal halves of radially directed spokes at the opposite angular margins thereof; means securing each spoke half to an angularly adjacent complementary spoke half on an adjacent spoke section of said spoke sections thereby defining a plurality of radially directed spokes; means securing all of said spoke sections to said tubular hub circumferentially of the hub; and means on the radially outer ends of said spokes for demountably mounting at least one rim; the means on the radially outer ends of the spokes for demountably mounting at least one rim including: a generally rectangular, cylindrically curved spoke shoe secured to the radially outer end of each spoke oriented so as to be convex radially outwardly of said hub and so as to have the axis of cylindrical curvature thereof parallel to the longitudinal axis of said hub; means formed on one axial end of each spoke shoe for wedgingly retaining a first rim, rim spacer means received on said spoke shoes having opposite axial ends, one end being constructed and arranged to abut said first rim and the other end being constructed and arranged to abuttingly receive a second rim thereagainst; and means secured to said spokes adjacent the outer end thereof and constructed and arranged to resiliently force the second rim toward said rim spacer means; the rim spacer means comprising a separate corrugated sheet metal rim spacer mounted on each spoke shoe, each having all corrugations therein oriented parallel to the longitudinal axis of said hub; the width of each rim spacer, measured along the length of said corrugations, being equal to the desired spacing of said first and second rims.

11. The fabricated spoke wheel of claim 10 wherein each rim spacer also includes a doubled-back tab at each end thereof constructed and arranged to axially slide about each respective spoke shoe to mount each rim spacer.

12. A rim spacer for use on a spoke wheel of the type demountably mounting two rims having tires thereon, constructed and arranged to maintain the two rims at a preselected minimum distance from one another, said rim spacer comprising a strip of corrugated sheet metal having all corrugations therein oriented parallel to the longitudinal axis of said wheel; the width of said rim spacer, measured along the length of said corrugations, being equal to the preselected minimum spacing of the two rims; said rim spacer having two arcuately opposite ends and including a doubled-back tab at each of said ends constructed and arranged for axially sliding securement of said spacer about a generally rectangular spoke shoe.

References Cited

UNITED STATES PATENTS

| | | | |
|---|---|---|---|
| 1,422,168 | 7/1922 | Barry | 301—66 |
| 1,593,886 | 7/1926 | Swain | 301—20 |
| 2,599,248 | 6/1952 | Forbes | 301—13 |
| 2,607,634 | 8/1952 | Faulkner | 301—66 |
| 2,660,477 | 11/1953 | Sherman | 301—13 |
| 2,757,971 | 8/1956 | Malthaner | 301—13 X |
| 3,013,842 | 12/1961 | Walther | 301—20 |
| 3,143,376 | 8/1964 | Federico | 301—13 |

OTHER REFERENCES

Krumm: German printed application No. 1,090,987, October 1960.

Kronenberg: German printed application No. 1,092,328, November 1960.

RICHARD J. JOHNSON, *Primary Examiner.*